United States Patent Office 3,488,568
Patented Jan. 6, 1970

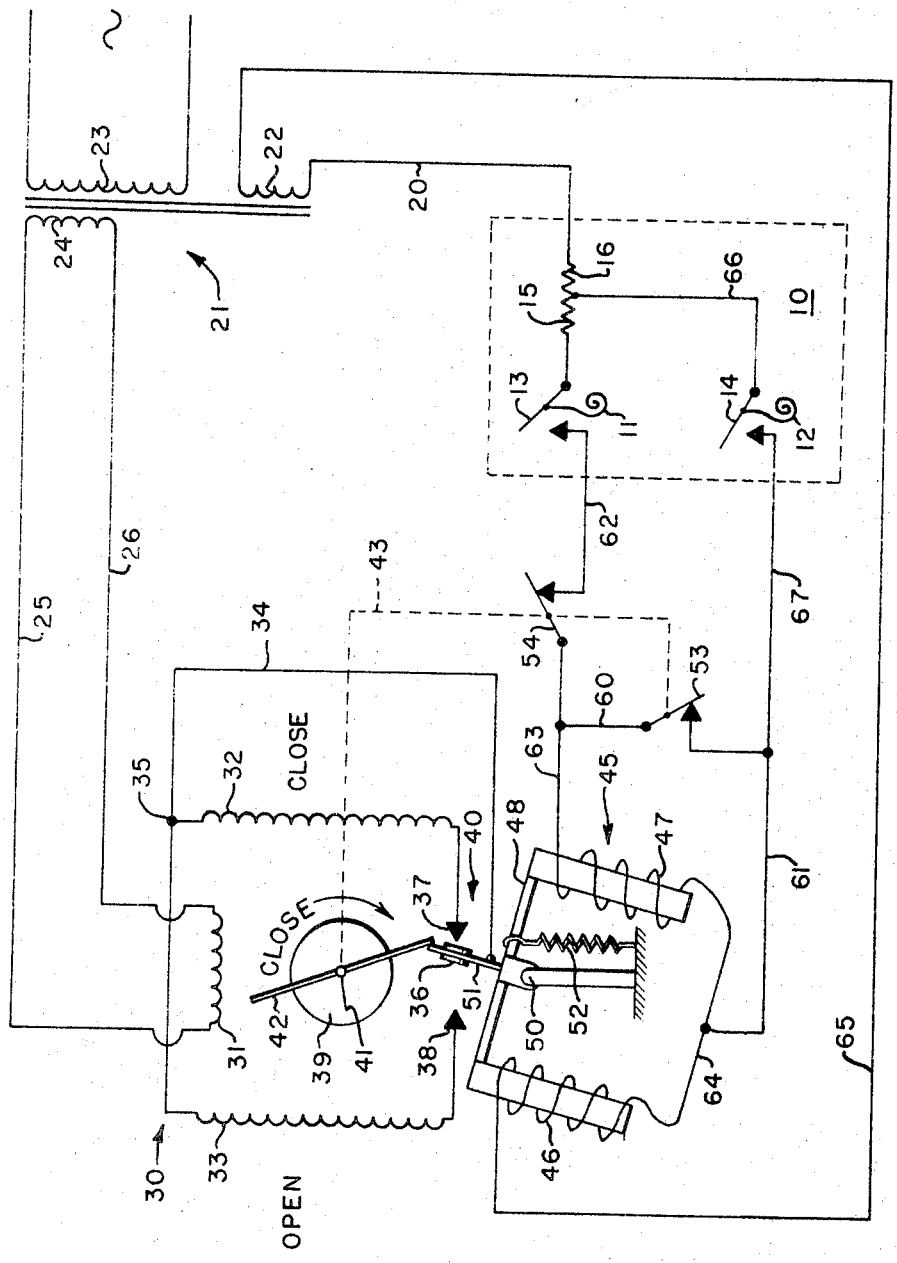

3,488,568
MULTIPOSITION CONTROL MOTOR
Curtis E. Westley, St. Louis Park, Minn., assignor to Honeywell Inc., Minneapolis, Minn., a corporation of Delaware
Filed Apr. 3, 1968, Ser. No. 718,492
Int. Cl. H02p 3/20
U.S. Cl. 318—208     5 Claims

ABSTRACT OF THE DISCLOSURE

A multiposition control motor with a mechanical output capable of being driven to opposite extreme positions and an intermediate position. The intermediate position is obtained by combining the action of a balanced three-position type relay and cam driven switches when the multiposition control motor is connected to a two-stage condition responsive device such as two-stage thermostat.

Background of the invention

The present invention provides for the operation of a reversible electric motor between two fixed positions and further provides for an intermediate position that can be readily adjusted between the two extreme positions. Ordinarily, a reversible electric motor cannot be operated in a three-position mode as it is impractical to stop the motor at an intermediate location. In many types of installations where a full modulating action of an electric motor is not necessary, it is desirable to obtain an intermediate position of the motor to obtain the desired degree of control of a load. In the past this has been accomplished, in some cases, by the application of a mechanical brake to the motor when the motor was de-energized or through the use of amechanical brake which was of sufficient capacity to lock the motor in a fixed position regardless of the energization of the motor. This type of an arrangement is uneconomical.

Summary of the invention

The present invention is specifically directed to the operation of a shaded pole type of reversible motor so as to provide the motor with an adjustable intermediate position. A shaded pole electric motor normally includes a permanently energized motor winding that supplies the driving power for the motor. The motor's starting torque and direction are established by short circuiting a second winding that creates a displaced phase condition and causes a motor to operate in the desired direction. By short circuiting a third winding that is properly displaced from the second it is possible to obtain reversal of the first direction of rotation. This type of motor ordinarily has but two end stop positions wherein the shorting windings are both open circuited.

With the present invention a three-position type of balance relay similar in structure to that shown in U.S. Patent No. 2,169,141 to Gille issued on Aug. 8, 1939 is utilized. The relay is modified by supplying a bias spring that acts with one of the coils in opposition to the other coil so that when both coils are equally energized electrically, a mid position of the relay armature occurs. This mid position allows for the contact structure to open circuit both of the motor windings that control its direction of operation. The relay is further constructed so as to mechanically engage an output mechanism connected to the motor shaft so that the motor shaft can also help position the relay contacts. This arrangement coupled with a pair of normally closed switches that are cam operated in sequence are coupled to a two-stage condition responsive device, shown as a thermostat. As the thermostat switches close, the multiposition motor is first driven to an intermediate open position and then to its full open position as the second thermostat switch closes. This allows for a heating system or damper connected to the multiposition motor to respond to the needs of the condition responsive means or thermostat.

Brief description of the drawing

The single figure disclosed is a combination of a schematic and pictorial presentation of a multiposition control motor mechanically linked to a three-position relay and a pair of normally closed switches. The motor and condition responsive device are shown as powered from a step-down type of transformer, or motor magnetic structure.

Description of the preferred embodiment

In order to explain and describe the preferred embodiment it will be assumed that the preferred embodiment is used for control of a valve or damper in a heating control system. As such, the valve or damper will have a closed position when no heat is required and an open position if maximum heating is desired. An intermediate position, for which the present application is particularly adapted, can be accomplished at a mid position. The drawing to be described discloses a system with the multiposition control motor and associated valve or damper (not shown) in the closed, or most clockwise rotational position of the motor. Reference will be made to opening or closing and this will be in the same frame of reference as clockwise and counterclockwise rotation of the motor.

A condition responsive means 10 has been disclosed and is in fact a two-stage thermostat. A pair of bimetals 11 and 12 operate a pair of normally open switches 13 and 14. The switches 13 and 14 are open when the temperature at the thermostat 10 is sufficiently high so as to require no additional heat. As heat is called for by the thermostat 10, the switch 13 closes under the influence of bimetal 11 prior to switch 14 which closes under the influence of bimetal 12. The thermostat or condition responsive means 10 includes a pair of resistances 15 and 16 which are conventional heat anticipating resistors.

Power is supplied on conductor 20 from a transformer generally disclosed at 21 which has a secondary winding 22 and a primary winding 23. Transformer 21 could also be an integral part of the motor magnetic structure. The primary winding 23 is connected to a conventional source of alternating current. The transformer 21 provides a step-down voltage in winding 22 so that low voltage control is possible. This transformer arrangement is not essential to the present invention but shows a preferred embodiment. The transformer 21 has a further winding 24 connected to a pair of conductors 25 and 26 that are in turn connected to a motor generally disclosed at 30. The motor 30 has a winding 31 that is in fact directly connected to conductors 25 and 26 so that they are continuously supplying energy to the winding 31. The motor 30 is a shaded pole induction type motor that is well known in the art. The motor 30 has a pair of windings 32 and 33. In reality, windings 32 and 33 are made up of two sections each but they have been shown as a simple winding each for convenience. Winding 32 is the closing winding and winding 33 is the opening winding. The motor 30 further has a short circuiting conductor 34 from a common point 35 between the windings 32 and 33. The conductor 34 is connected to a contact 36 that in turn operates between a pair of contacts 37 and 38 of a three position contact means generally shown at 40. The contact 36 when in electrical circuit with the contact 37 short circuits the winding 32 to cause the motor 30 to operate in a clockwise direction indicated as a closing direction. The contact 36 when in electrical circuit with the contact 38 short circuits the winding 33 which drives the motor 30 in an open or counterclockwise direction. The motor 30 is completed by an armature 39 of a shorted squirrel cage type, well known in the art, and which rotates under the influence of the field generated by the coil 31 and the short circuited coil 32 or 33. When neither of coils is short circuited, that is when the three-position switch means 40 has contact 36 between the contacts 37 and 38, no rotational output is developed by the motor 30. The motor 30 further has a normal gear reduction output (not shown) as is conventional in control motors to an output shaft 41. The output shaft 41 in turn drives mechanical output means 42 which is mechanically linked to a cam means or similar member 43. The output shaft 41 also is connected to a valve or damper (not shown) which controls the heating media to the space which is controlled by the condition responsive means or thermostat 10.

Associated with and controlling the three-position contact means 40 is a resiliently biased three-position relay means 45. This relay is generally constructed similar to the relay disclosed in U.S. Patent 2,169,141 issued on Aug. 8, 1939, to Gille. The relay includes a first coil 46 and a second coil 47 which each encircle part of an armature means 48. The armature means 48 is pivoted at 50 and is connected at 51 to contact 36 of the three-position contact means 40. A resilient bias means 52, in the form of a spring, is connected to a bias on the relay means 45 so that it tends to rotate in a clockwise direction, as shown, in the drawing. Without any energy being supplied to the coils 45 and 46, the resilient bias means 52 keeps the armature means 48 tipped in the clockwise position. The coils 45 and 46 are so selected in number of turns that when the coils 45 and 46 are energized by the same current magnitude, they cause the armature 48 to be balanced in a center position. Stated another way, the effect of coil 47 and the resilient bias means 52 equals the mechanical force developed by the coil 46.

In order to complete the control circuitry for this motor, a pair of normally closed switches 53 and 54 are provided. The switches 53 and 54 are operated on by the cam 43 and when the cam 43 is rotated, switch 53 is operated sequentially with switch 54. That is, in one direction of rotation of cam 43, switch 53 opens slightly before switch 54. In the reverse direction of operation of cam 43, switch 54 closes just before the closing of switch 53. The cam 54 is made adjustable with respect to output shaft 41 of the motor 30 thereby allowing for adjustment of the rotational operating position of the switches 53 and 54 with respect to the shaft 41.

The switch 53 is connected by conductors 60 and 61 in parallel with the coil 47. A group of conductors 62, 63, 64 and 65 form a series circuit from the thermostat means 10 through the switch 54 and the coils 47 and 46. The conductor 65 is connected to the transformer secondary 22 which in turn is connected to conductor 20 through the resistors 15 and 16 to the switch 13 to complete this series circuit. A further connection means made up of conductors 66 and 67 connect the second condition responsive switch 14 between the junction of the resistors 15 and 16 and the junction of coils 46 and 47 at conductor 64.

Operation

With the multiposition control motor in the condition shown in the drawing, the thermostat means 10 is satisfied and the motor armaature 39 has rotated so that the associated valve or damper (not shown) is in the closed position. This involves the mechanical output means 42 just engaging the center contact 36 so as to open the circuit between contacts 36 and 37 thereby causing the motor 30 to become inactive.

If the temperature at the condition responsive or thermostat means 10 falls, the switch 13 closes. This completes a circuit from the transformer secondary 22 through the normally closed switch 54 and through the normally closed switch 53 to conductor 61 and then through the coil 46 back to the transformer secondary 22. The energy supplied to coil 46 of the relay means 45 causes the armature means 48 to move counterclockwise and since only coil 46 is energized the contact 36 of the three-position switch means 40 engages contact 38. Upon so doing, the winding 33 (which drives the motor 30 in an open direction) becomes active. The motor 30 starts to rotate in the counterclockwise direction. This opens the associated valve or damper (not shown) allowing heat to flow to the area controlled by the thermostat or condition responsive means 10. The operation of the motor 30, so that the mechanical output means 42 rotates, in turn operates the cam 43 to open the switch 53 prior to the time the motor 30 rotates fully to its most counterclockwise position. The opening of switch 53 opens the short circuit around the coil 47. The coil 47 is thus placed in series with coil 46 and the still closed switch 54. This supplies power to cause the armature means 48 to assume a center or balanced position wherein the effect of the coil 47 and spring 52 equal the effect of the coil 46. As soon as the armature means 48 assumes a center position, the contact 36 of the three-position switch means 40 is in an open condition with respect to both of the contacts 37 and 38. The motor stops rotating.

If the temperature at the condition responsive or thermostat means 10 still continues to fall, thereby calling for more heat, the thermostatically controlled switch 14 closes. The closing of switch 14 effectively shorts out coil 47 thereby energizing coil 46 across the transformer secondary 22. This again moves the contact 36 into engagement with contact 38 and causes the winding 33 to become operative to continue the motor rotation in a counterclockwise direction. When the motor armature 39 reaches its full travel in the counterclockwise direction, the mechanical output means 42 engages the contact means 36 while rotating in a counterclockwise fashion thereby opening the connection between the contacts 36 and 38. This deenergizes the operation of the motor again and keeps valve or damper means associated with the motor in a full open position. During this final operating phase the cam means 43 opens the switch 54 preparing the system for a return as soon as the condition responsive or thermostate means 10 is satisfied.

As soon as the temperature rises sufficiently at the condition responsive or thermostate means 10, the switch 14 controlled by bimetal 12 open circuits thereby removing the energy supplied to coil 46 which has kept the armature means 48 pivoted in a counterclockwise direction. At this time the resilient bias means or spring 52 pulls the contact 36 into electrical contact with the contact member 37 and the motor starts driving in a clockwise or closed direction because the winding 32 is shorted out. This operation continues until the cam 43 closes the switch 54 at which time a circuit is completed through both of the coils 46 and 47 to reposition the contact 36 in between the contact members 37 and 38 thereby deenergizing the motor 30. If the contact 13 of the condition responsive or thermostat means 10 is then opened by a continued increase in heat at the thermostat means 10, the spring or resilient bias means 52 once again pulls the contacts 36 and 37 into engagement to cause the motor 30 to continue to rotate in the closed or clockwise direction until the position shown in the drawing is again reached.

It is apparent from the above description of operation that the present system provides for the response of a normal two position motor in a three-position mode thereby providing the closed, intermediate, and an open position to respond to the two-stage condition responsive or thermostat means 10. The position of the cam 43 can be adjusted so that the intermediate operation of switches 53 and 54 can be controlled thereby adjusting the operation of the multiposition control motor to any two-stage system. The disclosure contained is of the preferred embodiment and this embodiment could be varied in many details without varying outside of the scope of the invention contained in the present application. For these reasons, the applicant wishes to be limited in the scope of his invention solely by the scope of the appended claims.

The embodiments of the invention in which an exclusive property or right is claimed are defined as follows:

1. A multiposition control motor, including: a reversible electric motor having reversing circuit means and mechancial output means; a resiliency biased three-position relay having a first coil and a second coil to operate armature means and three-position contact means; said armature means assuming a position when said coils are energized wherein said first coil balances the effect of said second coil and a resilient bias; said mechanical output means engaging said armature means to move said contact means at opposite extreme positions of travel of said output means to in turn operate said reversing circuit means; two normally closed switches which are opened in sequence by said mechanical output means between said opposite extreme positions of travel; a first of said normally closed switches connected across said second relay coil; control circuit means adapted to be connected to condition responsive switch means including two condition responsive sequentially operated switches; said control circuit means including connecting means connecting a first of said condition responsive switches in a series circuit with a second of said normally closed switches and said coils; and further connection means connecting a second of said condition responsive switches in a series circuit with said first coil.

2. A multiposition control motor as described in claim 1 wherein said motor and said reversing circuit means includes a pair of motor shading coils which when individually short circuited cause said mechanical output means to operate in opposite directions.

3. A multiposition control motor as described in claim 1 wherein said mechanical output means includes lever means to operate said three-position contact means and a cam to in turn operate said two normally closed switches.

4. A multiposition control motor as described in claim 3 wherein said cam is adjustable with respect to said output means to adjust the position of operation of said two normally closed switches.

5. A multiposition control motor as described in claim 4 wherein said motor and said motor reversing circuit means includes a pair of motor shading coils which when individually short circuited cause said mechanical output means to operate in opposite directions.

References Cited

UNITED STATES PATENTS

| | | | |
|---|---|---|---|
| 2,169,141 | 8/1939 | Gille | 335—185 |
| 2,310,955 | 2/1943 | Hornfeck | 318—208 |
| 3,153,754 | 10/1964 | McDonald | 318—208 |

B. DOBECK, Primary Examiner

K. L. CROSSON, Assistant Examiner

U.S. Cl. X.R.

318—286, 297, 299